Figure 1:
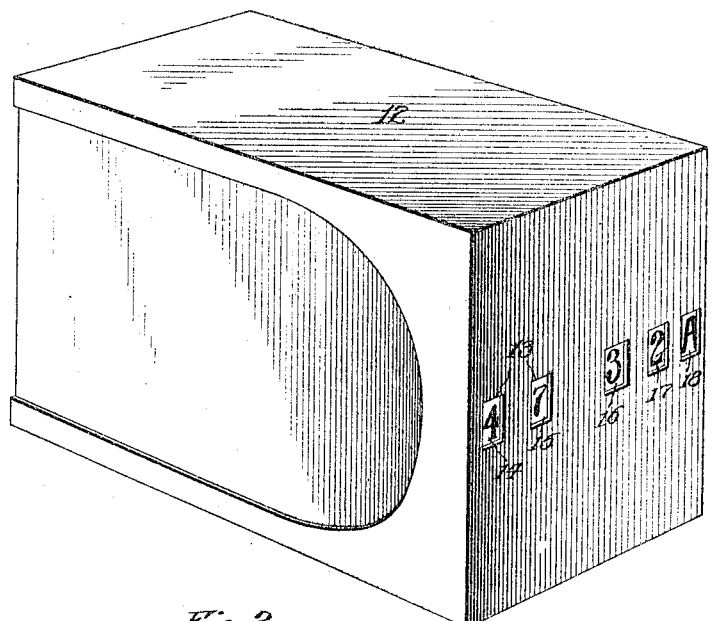

A. F. DIXON.
INDICATOR.
APPLICATION FILED SEPT. 26, 1908.

1,045,686.

Patented Nov. 26, 1912.
9 SHEETS—SHEET 1.

Witnesses:
Irving MacDonald
McClelland Young

Inventor:
Amos F Dixon
By Barton, Tanner & Falk,
Attys.

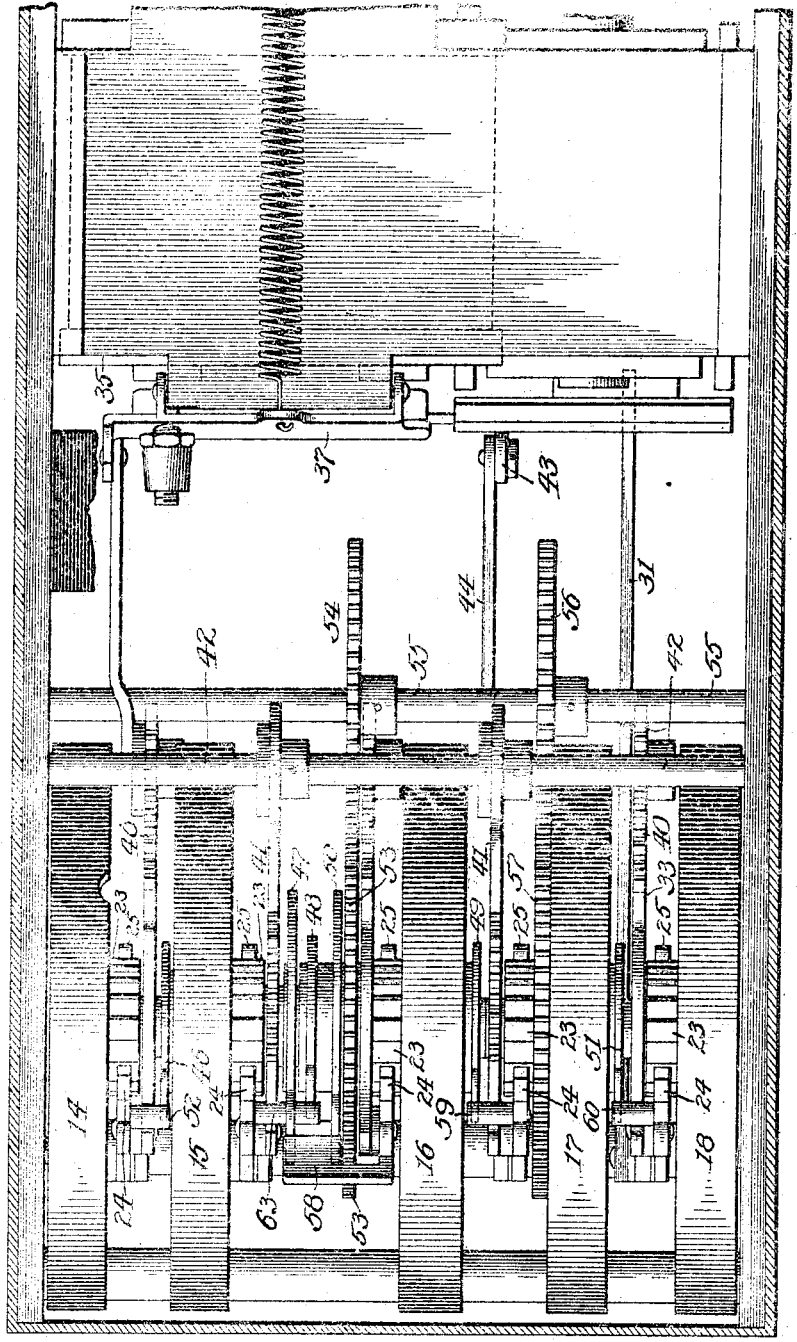

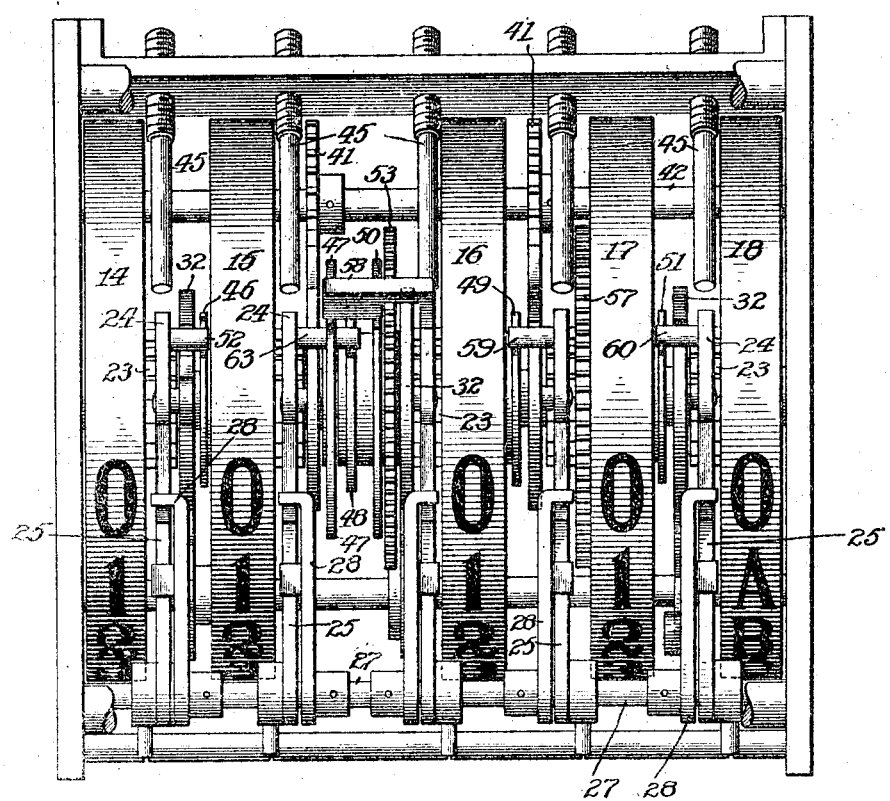

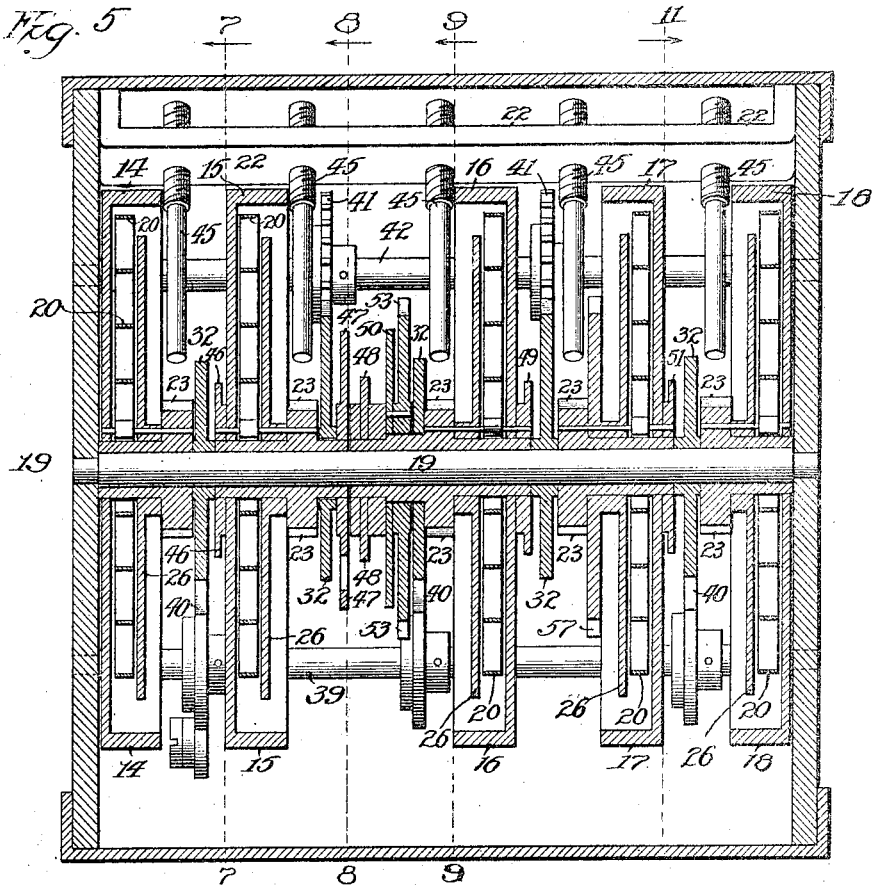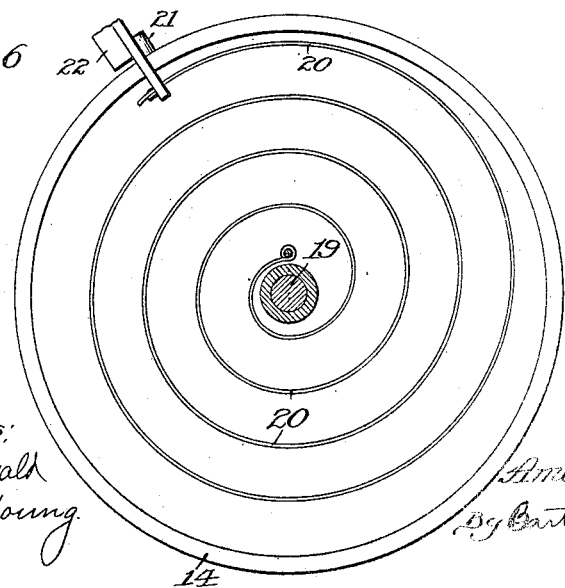

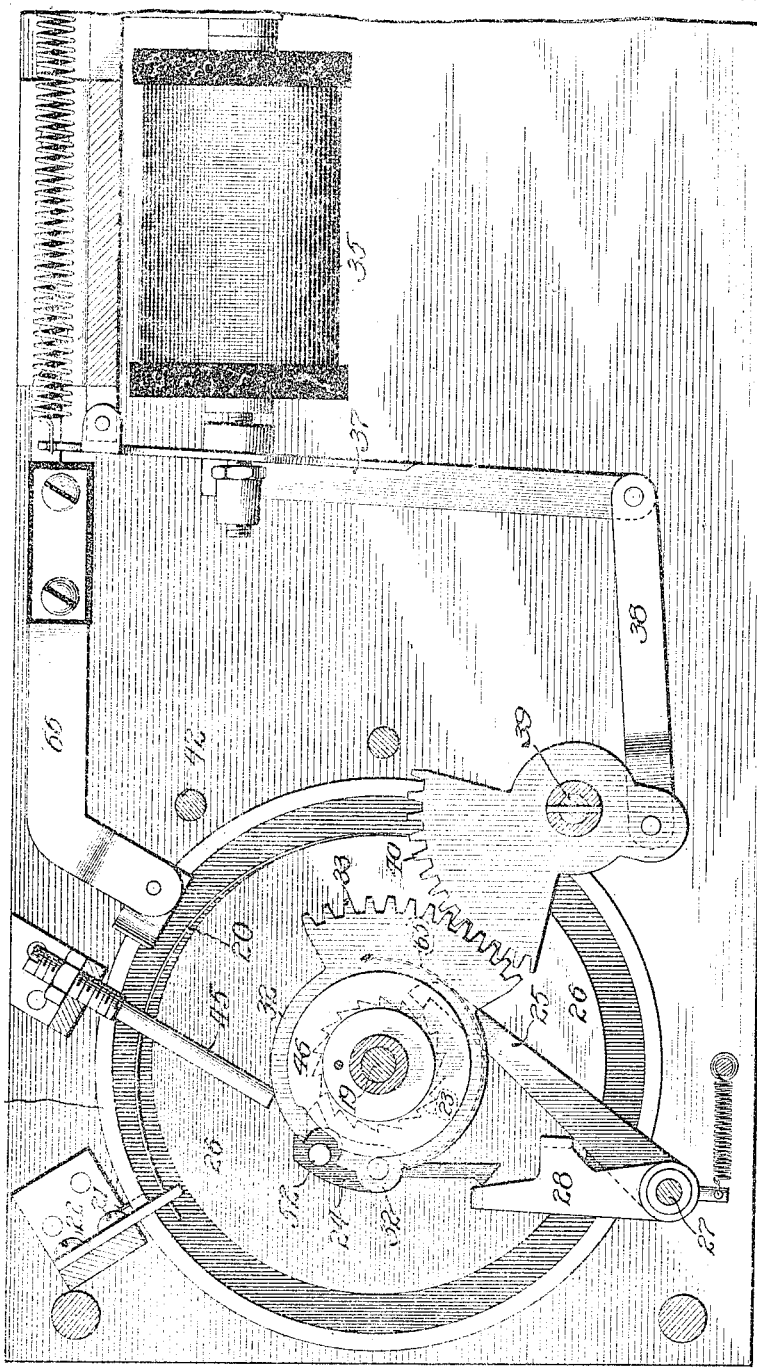

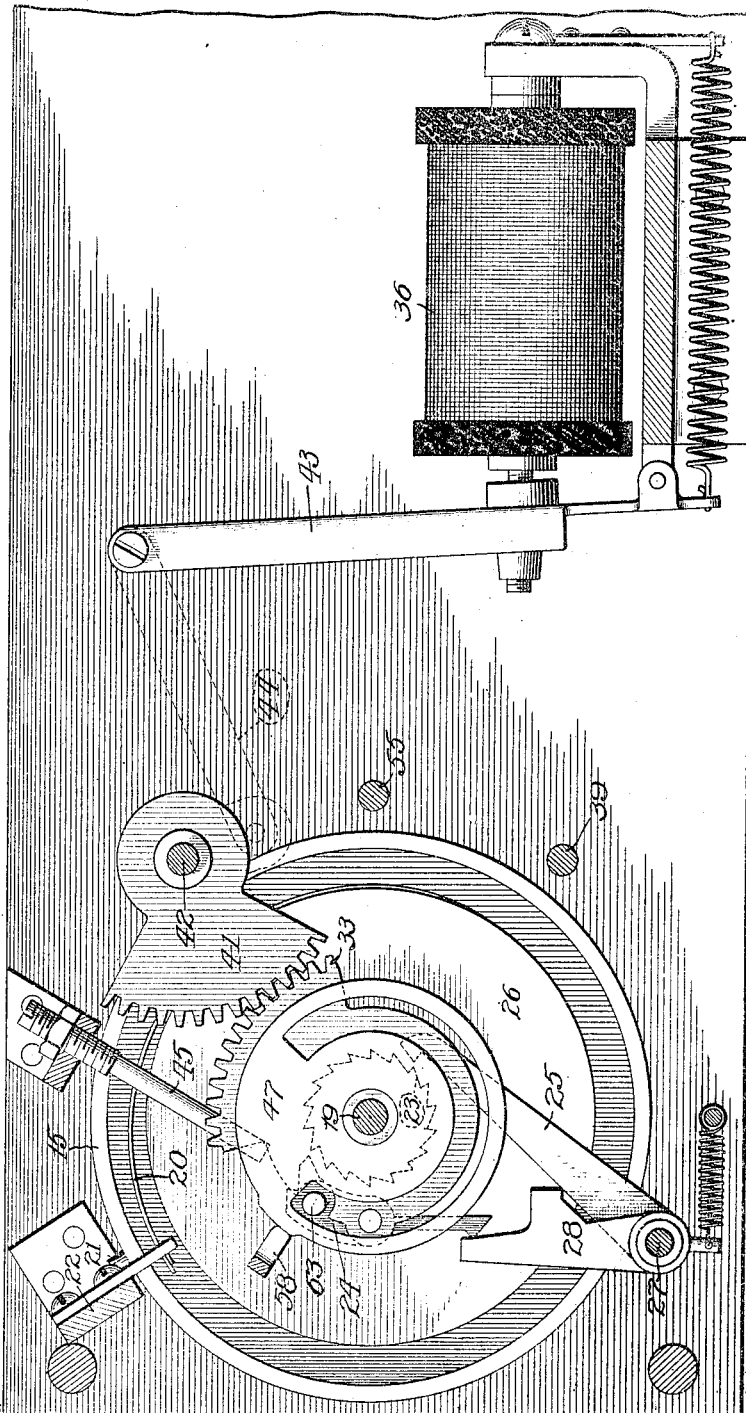

A. F. DIXON.
INDICATOR.
APPLICATION FILED SEPT. 26, 1908.
1,045,686.
Patented Nov. 26, 1912.
9 SHEETS—SHEET 7.
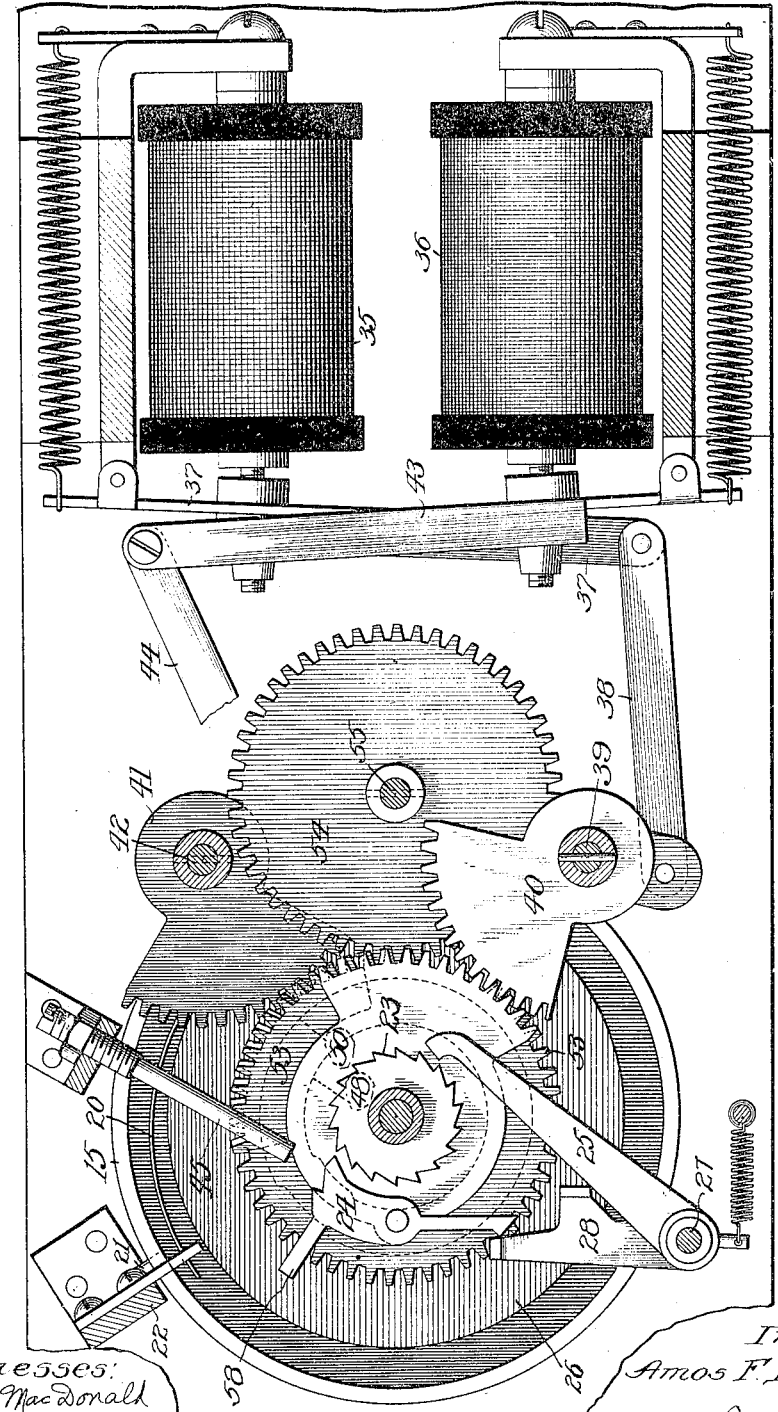
Witnesses:
Irving MacDonald
McClelland Young.
Inventor
Amos F. Dixon
By Barton, Tanner & Folk,
Attys.

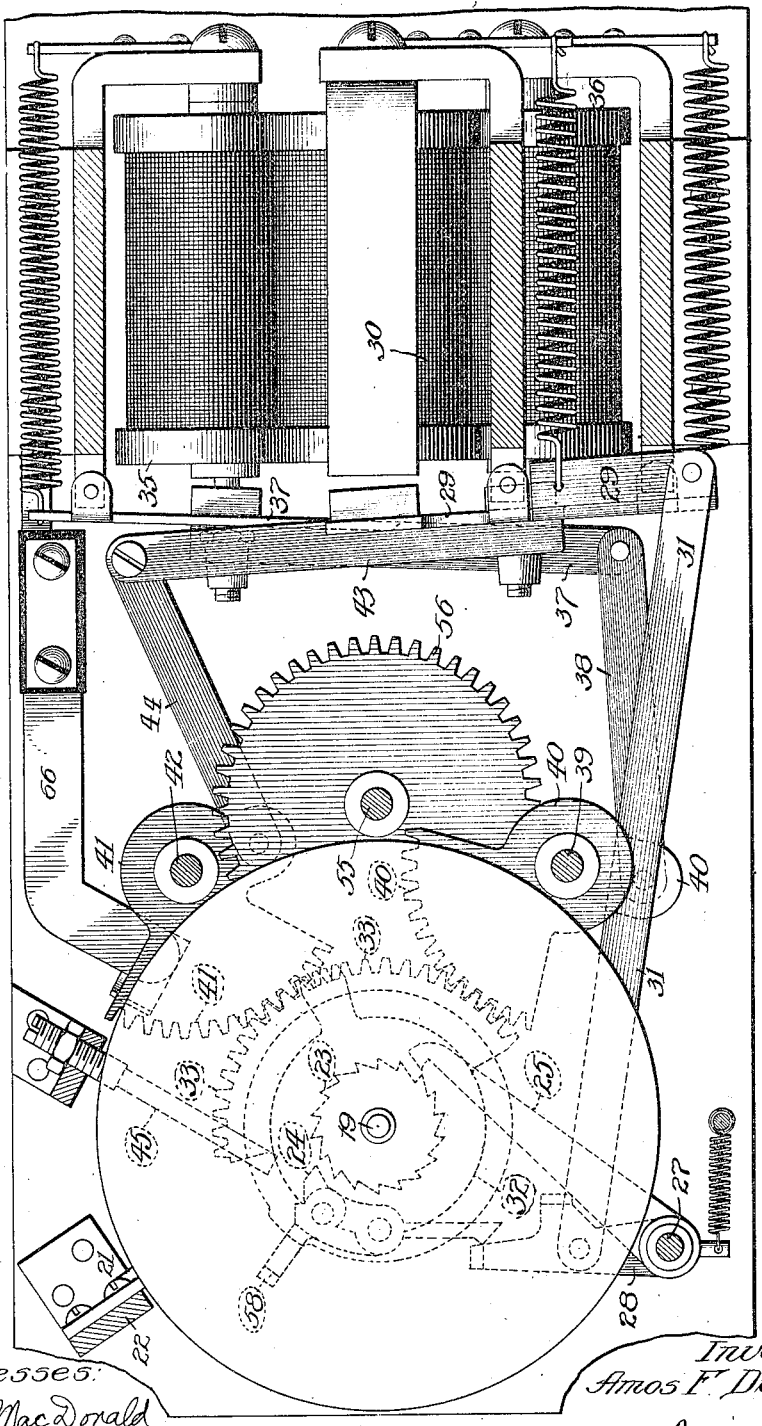

A. F. DIXON.
INDICATOR.
APPLICATION FILED SEPT. 26, 1908.

1,045,686.

Patented Nov. 26, 1912.
9 SHEETS—SHEET 9.

Witnesses:
Irving MacDonald
McClelland Young.

Inventor:
Amos F. Dixon
By Barton, Bruner & Folx,
Attys.

UNITED STATES PATENT OFFICE.

AMOS F. DIXON, OF NEW YORK, N. Y., ASSIGNOR TO WESTERN ELECTRIC COMPANY, OF CHICAGO, ILLINOIS, A CORPORATION OF ILLINOIS.

INDICATOR.

1,045,686.  Specification of Letters Patent.  Patented Nov. 26, 1912.

Application filed September 26, 1908.  Serial No. 454,396.

*To all whom it may concern:*

Be it known that I, AMOS F. DIXON, citizen of the United States, residing at New York, in the county of New York and State of New York, have invented a certain new and useful Improvement in Indicators, of which the following is a full, clear, concise, and exact description.

This invention relates to an indicator, and its object is to provide a device of compact construction which will be capable of indicating in figures or characters any number or combination of characters (within its capacity) in response to electrical impulses transmitted in groups corresponding to the digits or characters of such number or combination. Such a device will be of utility, for example, in connection with trunk lines leading from "automatic" telephone exchanges to "manual" exchanges not equipped with automatic selecting mechanism. In an automatic exchange the selective apparatus is ordinarily operated by electrical impulses which are transmitted over a line circuit to act upon electromagnetic step-by-step switching mechanism. Thus, to select line No. 294, for instance, there might be transmitted first two impulses to select the required "hundred" group, then nine impulses to select the required "tens" group in the selected hundred, and then four impulses to select the particular line required in the selected ten. These different groups of impulses may be transmitted over the same wire or different wires to act upon different mechanisms, which are brought one after the other into condition to receive them, and which are caused thereby to extend the connection from the calling line to the line wanted. It often happens, however, that a subscriber in the automatic exchange desires connection with a line in a manual exchange not equipped with automatic selecting switches. It is the plan of the present invention to provide means whereby in such case, upon the selection of a trunk line leading to the manual exchange, the selecting impulses which would in the automatic exchange operate line-switching mechanism to connect with the desired line, may operate instead an indicator at the manual exchange office to display the number of such wanted line. The manual office operator may then with the ordinary appliances unite the calling trunk line with the subscriber's line designated by the number which has appeared upon the indicator, without the necessity of communicating by telephone with the calling subscriber (or with the operator, in the case of a semi-automatic system) at the automatic exchange. In accordance with the present invention, therefore, the indicator is provided with a number of indicating parts adapted to be displaced in such a manner as to display the digits of a number, and an electromagnet is arranged to mechanically displace each of several digit-indicators in sequence, means being provided for shifting the operative connection of the electromagnet from one of these indicators to another. As a further development of this idea, two magnets may be arranged to act upon alternate digit-indicators throughout the whole series, means being provided whereby upon the operation of each magnet in displacing one indicator, the next indicator of the series is brought into operative relation to the other magnet. The magnets may then be operated alternately by successive groups of transmitted impulses, and caused to act in turn upon the different digit indicators one after the other.

Further features of this invention reside in various details of construction, whereby the indicating mechanism is made compact, certain in operation, and comparatively simple in its various elements and in its mode of operation.

Figure 2:
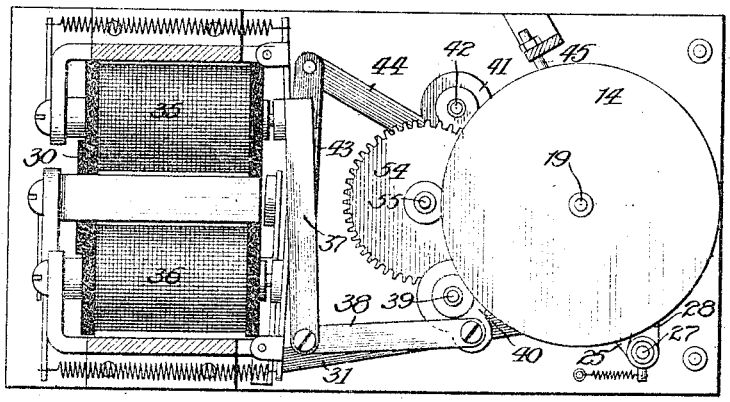
Figure 11:
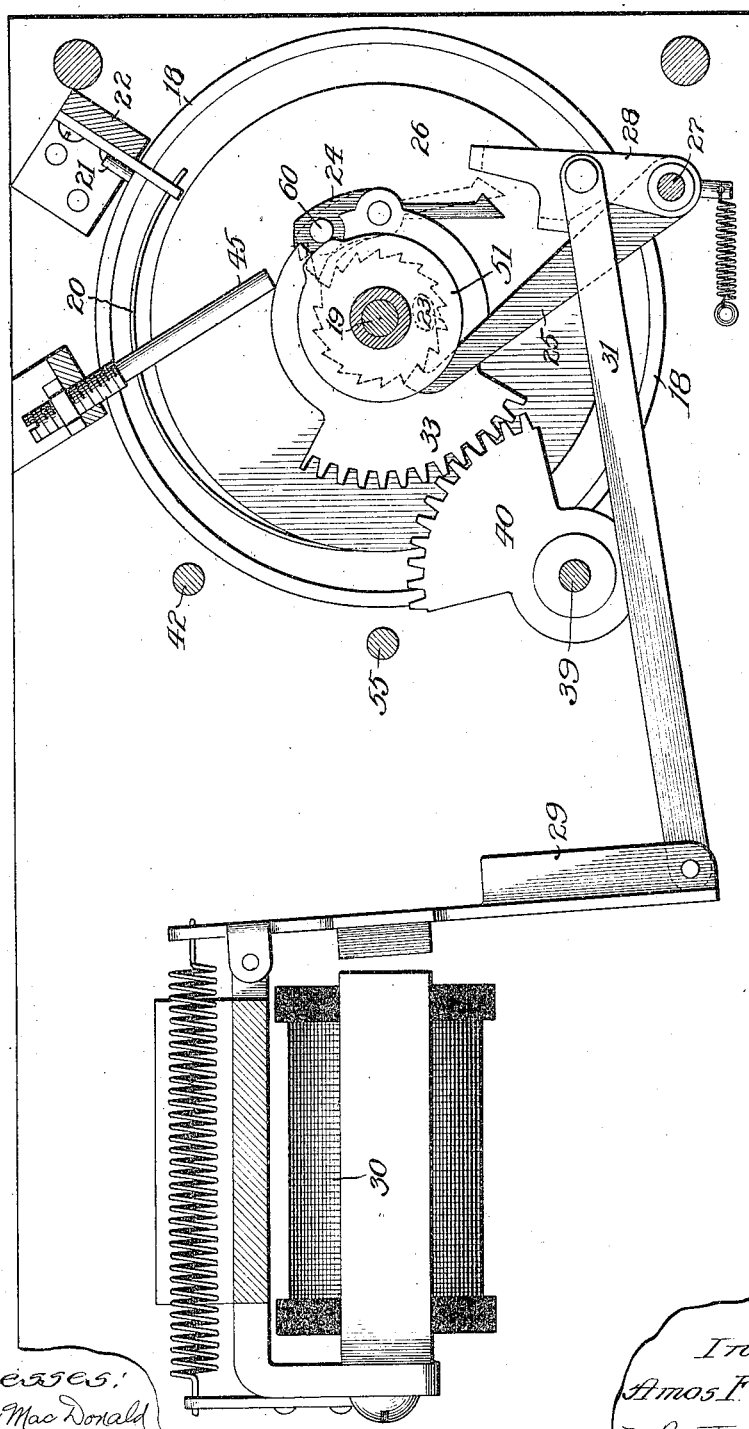

In the accompanying drawings, which illustrate one of the many forms or embodiments of the invention, Figure 1 is a perspective view of the indicator inclosed in its casing, a number being displayed behind the windows in the face of the casing; Fig. 2 is a side view of the mechanism, the side supporting plate being removed; Fig. 3 is a plan view of the mechanism, on an enlarged scale; Fig. 4 is a front view thereof; Fig. 5 is a transverse sectional view on the line of the shaft which carries the indicating wheels; Fig. 6 is a detail view showing one of the indicating wheels with the spiral spring for returning it to normal position; Fig. 7 is a longitudinal sectional view on line 7—7 of Fig. 5, showing the first of the series of indicating wheels and its operating mechanism; Fig. 8 is a similar view on line 8—8 of Fig. 5, showing the second indicating wheel and its operating mechanism, the stepping magnet of the first wheel being omitted; Fig. 9 is a sectional view on line 9—9 of Fig. 5, showing the operating mechanism of the third indicating wheel; Fig. 10 is a side view of the mechanism with the outer supporting plate removed, looking on the opposite side of Fig. 2; Fig. 11 is a detail sectional view of a modified form as though on line 11—11 of Fig. 5, except that the holding and stepping pawls for the indicator ratchets are arranged to be thrown out of service by a "release" magnet, instead of being thrown into service by a "holding" magnet as in the other figures.

The same reference numerals indicate the same parts throughout the drawings.

As shown in Fig. 1, the indicating mechanism is inclosed within a casing 12, provided with windows 13 in its face, through which letters, numerals or other characters, borne by indicator wheels within the casing, may be seen. In the mechanism shown, there are five indicator wheels 14, 15, 16, 17 and 18, respectively; each of which has painted upon its periphery a series of numerals (or letters in the case of the last wheel 18) which as the wheel turns are adapted to be brought successively into view before the corresponding window in the casing. Each of these indicator wheels is adapted to be independently rotated step-by-step, by pawl and ratchet mechanism, and when released is returned by a spring 20 until a pin or stud 21 carried by the wheel abuts against a stop 22 on the stationary frame, this engagement determining the normal position of the wheel.

In the particular mechanism shown, the normal position of each wheel is such that it will require two steps in order to bring the first figure on its dial into position before the window corresponding to such wheel; but it is evident that any desired normal position of the indicating characters may be provided for. The particular indicator shown was primarily designed for use in conjunction with a semi-automatic telephone exchange system in which each group of impulses transmitted to the indicator includes a preliminary impulse, added to the significant impulses which correspond in number to the particular digit to be displayed. If desired, the indicator wheels may be arranged to operate electrical switches. Thus, as shown in Fig. 7, the pair of contact springs 66 may be closed together by the edge of wheel 14 acting as a cam.

As shown in Fig. 5, the indicating wheels are all loosely mounted to rotate upon a shaft 19. The hub or collar which supports each wheel is formed or provided with a ratchet 23 by which it may be advanced by a stepping pawl 24, and the hub of each wheel also preferably carries a disk 26 which serves to prevent lateral displacement of the return spring 20. Adjustable stop-posts 45 are preferably provided for limiting the advance of the stepping pawls 24, so that the extent of advance of the indicator wheels for each step may be accurately gauged. The stepping pawls 24 may be provided with springs such as 65 (Fig. 7) to press them toward their respective ratchets.

As shown for example in Figs. 4 and 7, the holding pawls 25 of the several ratchets are mounted loosely upon a rock-shaft 27, and are arranged to be maintained yieldingly in engagement with their ratchets by suitable springs. Arms 28 fixed upon said rock-shaft are adapted to engage the holding pawls and stepping pawls to throw them out of service. As shown in Fig. 10, the shaft 27 is arranged to be rocked by the armature lever 29 of the retaining magnet 30, said armature lever being connected by a link 31 with one of the arms 28 fixed to said rock-shaft. In the form of mechanism shown in Figs. 1 to 10 inclusive, the magnet 30 is a "holding" magnet and acts when excited to bring the holding pawls into service, the retraction of the armature when the magnet is deënergized causing the arms 28 to throw the stepping and holding pawls out of service and permit the indicator wheels to return to normal. In the modified form shown in Fig. 11 the magnet 30 is a "release" magnet, the holding pawls being normally in service and the armature of the magnet connected to throw them out of service when said magnet is excited. The stepping pawl 24 for each ratchet (Fig 7) is carried by a disk 32 mounted adjacent to the ratchet in such a manner that it may be rotated to cause the pawl 24 carried thereby to step the ratchet ahead. As shown in Fig. 5, the pawl-carrying disks 32 of wheels 14, 17 and 18 are mounted to rotate upon the shaft 19; while the similar disks 32 for the ratchets of wheels 15 and 16 are rotatably mounted upon the collars or hubs of said ratchet. Each of the pawl-carrying disks 32 is formed with a segmental rack 33. A set of driving segments 40 fixed upon a rotatable shaft 39 is arranged to mesh with the racks upon the pawl-carrying disks 32 of the indicator wheels 14, 16 and 18; and a similar set of driving segments 41 fixed upon a rotatable shaft 42 is arranged to mesh with the racks upon the pawl-carrying disks 32 of indicator wheels 15 and 17. The driving segments 40 and 41 are arranged to be operated by the stepping magnets 35 and 36 respectively (Figs. 2 and 10). The armature lever 37 of the stepping magnet 35 is connected by a link 38 to one of the driving segments 40 on the shaft 39; and the armature lever 43 of stepping magnet 36 is connected by a link 44 to one of the driving segments 41 on the shaft 42. It will thus be seen that the stepping magnets 35 and 36 are arranged to operate the stepping pawls 24 for the ratchets of alternate indicator wheels throughout the series, the magnet 35 operating the stepping pawls for wheels 14, 16 and 18 while the magnet 36 operates the stepping pawls for wheels 15 and 17.

I will now proceed to describe the means whereby the indicator wheels are caused to be actuated in succession by the magnets 35 and 36 acting alternately. Each indicating wheel intermediate in the series is adapted in its displacement to prevent the further advance of the wheel preceding in the series and also to establish a condition permitting the subsequent advance of the wheel next succeeding in the series. This can be accomplished by causing the displacement of each intermediate wheel to throw the stepping pawl of the preceding wheel out of engagement with its ratchet and also to remove an obstruction which normally prevents the stepping pawl of the succeeding wheel from engaging the ratchet of that wheel. In the form of mechanism shown, therefore, each intermediate wheel is arranged to move two cams controlling the operative positions of the stepping pawls of the wheels on either side thereof.

As shown in Figs. 3 and 5, the wheel 15 carries cams 46 and 47, revolving therewith to control the operative positions of the stepping pawls 24 of the preceding and succeeding wheels 14 and 16 respectively. The wheel 16 likewise carries cams 48 and 49, controlling the operative positions of the stepping pawls for wheels 15 and 17, respectively; and wheel 17 carries cam 51 and is geared to operate cam 50, controlling the operative positions of the stepping pawls for wheels 16 and 18, respectively.

As shown most clearly in Fig. 7, the cam 46 is a disk, which when rotated away from its normal position, is adapted to engage a pin 52 carried by the stepping pawl 24 of wheel 14, and prevent said pawl from engaging its ratchet. Said disk 46, however, as shown in Fig. 7, has a portion cut away from its periphery at the place which lies under the pin 52 in the normal position of said disk, so that the disk does not interfere with the operation of the pawl except when said disk is rotated away from its normal position. The cam 48, moving with wheel 16, is similar to cam 46, and in a similar way is adapted when rotated away from its normal position to engage a pin 63 carried by the stepping pawl of wheel 15. The cam 50 is a disk similar in shape to the cams 46 and 48, but is somewhat larger and instead of being directly carried by the indicator wheel 17 it is, owing to its position, geared to rotate with said wheel 17. That is to say, the cam 50 is carried by a gear wheel 53 which meshes with a similar gear wheel 54 upon a counter shaft 55. Said shaft 55 carries another gear wheel 56 which is driven by a similar gear wheel 57 carried by the hub of the wheel 17. The stepping pawl 24 for the wheel 16, as shown in Figs. 3 and 9, instead of having a pin such as 52 or 63, is provided with a lug 58 which reaches over the edge of gear wheel 53, and is arranged to ride upon the edges of cams 47 and 50, either one of which may prevent its engagement with its ratchet.

The cam 49 carried by wheel 16 is a disk having a projection upon its periphery which in the normal position of said disk is adapted to engage a pin 59 carried by the stepping pawl 24 of wheel 17, but when said cam 49 is rotated away from its normal position it no longer interferes with the operation of said pawl. The cam 51 carried by wheel 17 is a disk similar to the cam or disk 49, and in a similar way by engaging pin 60 normally prevents the operation of the stepping pawl of the last indicating wheel 18.

The cam 47 which is fixed upon the hub of indicator wheel 15 and rotates therewith is similar in outline to cams 49 and 51, but is larger, and normally engages the lug 58 carried by the stepping pawl of wheel 16 to prevent the operation of said wheel except when wheel 15 is displaced from normal. Said cam 47 has an opening through which the pin 63 carried by the stepping pawl of wheel 15 projects to engage the edge of cam 48.

The operation of the mechanism is as follows: In order to permit the indicator wheels to be stepped around, the rock-shaft 27 must be turned in a direction to swing the arms 28 away from the holding and stepping pawls to permit said pawls to be put into service. In the form of mechanism shown in Fig. 11, this is the normal condition, but in the form shown in the other figures, it is brought about by energizing the holding magnet 30. Now the stepping magnet 35 is ready to receive electrical impulses, and at each impulse rocks the shaft 39 which is geared by the segmental gears to the disks 32 which carry the stepping pawls for wheels 14, 16 and 18. At this time, however, cams 47 and 51 are in their normal positions, and prevent the stepping pawls for wheels 16 and 18 from engaging their respective ratchets, so that wheel 14 alone is advanced. The extent of displacement of wheel 14 will correspond to the number of impulses received by magnet 35, as said wheel is advanced one step at each impulse. After wheel 14 has thus been advanced, the next group of impulses will act upon stepping magnet 36. This rocks the shaft 42, geared by the segmental gears to the disks which carry the stepping pawls for wheels 15 and 17. As the cam 49 is in its normal position, only the indicating wheel 15 will be advanced. Now when magnet 35 is again excited by the third group of impulses, the stepping pawls for wheels 14, 16 and 18 will be operated as before, but now wheel 16 will be advanced because cams 46 and 47 have been rotated by the displacement of wheel 15, cam 46 throwing the stepping pawl for wheel 14 out of service and cam 47 permitting the stepping pawl of wheel 16 to engage its ratchet. Cam 51 is still in its normal position preventing the operation of wheel 18. After wheel 16 has been displaced, magnet 36 may act to operate wheel 17, the cam 48 preventing the operation of wheel 15 and the cam 49 permitting the stepping pawl to engage the ratchet of wheel 17. After the second operation of magnet 36, the magnet 35 may respond to the fifth group of impulses, to operate wheel 18, cam 51 having been rotated by wheel 17, and cams 46 and 50 preventing the operation of wheels 14 and 16. The parts may be returned to normal at any time by shifting the rock shaft 27, as by deënergizing the holding magnet, to cause the arms 28 to throw all the stepping and holding pawls out of engagement with their respective ratchets, whereupon the springs 20 will act to carry the wheels back until the stop pins 21 engage the stop bar 22.

I claim:—

1. In an indicating mechanism, the combination with an electromagnet adapted to receive current impulses, of indicating parts arranged to be displaced by said magnet and to indicate by the extent of such displacement the number of impulses received by the magnet, a second magnet, and means controlled thereby for shifting the operative connection of the first magnet from one to another of said indicating parts.

2. In an indicating mechanism, the combination with a pair of electromagnets adapted in alternation to receive current-impulses, of a series of indicating parts adapted to be displaced by said magnets and to indicate by the extent of such displacement the number of impulses received, and means actuated by the operation of each magnet in displacing each of said indicating parts intermediate in the series to bring the next indicating part in the series under control of the other magnet.

3. In an indicator, the combination with a series of movable indicating parts, of a pair of magnets, driving mechanism operated by each of said magnets normally in operative connection to the first two respectively, of said indicating parts, and means operated by the action of each magnet for shifting the operative connection of the driving mechanism of the other magnet to the indicating part next following in the series.

4. In an indicator, the combination with a series of indicating wheels, of driving mechanism for each, and parts carried by each of the intermediate wheels of the series controlling the operative connection of the driving mechanism to the wheels next preceding and next succeeding in the series.

5. In an indicator, the combination with a series of indicating wheels, of driving mechanism for each, and a part carried by each wheel intermediate in the series adapted upon the displacement of such wheel from its normal position to render inoperative the driving mechanism of the wheel next preceding in the series.

6. In an indicator mechanism, the combination with a series of indicating parts and driving mechanism for each, of means operated by each indicating part intermediate in the series for rendering inoperative the driving mechanism of the indicating part next preceding in the series.

7. In an indicator mechanism, the combination with a series of indicating parts and driving mechanism for each, the driving mechanism of the indicating parts intermediate in the series being normally out of operative relation to such parts, and means actuated by each of said intermediate indicating parts for making operative the driving mechanism of the indicating part next succeeding in the series.

8. In an indicator, the combination with a series of indicating parts and driving mechanism for each, of means actuated by each indicating part intermediate in the series for rendering inoperative the driving mechanism of the next preceding part and rendering operative the driving mechanism of the part next succeeding in the series.

9. In an indicator, the combination with a number of indicating parts each having a driving ratchet, of stepping pawls adapted to advance said ratchets, a magnet adapted to operate said pawls simultaneously, and shifting means for bringing said pawls one after the other into engagement with their respective ratchets; whereby the magnet may be caused to operate said indicating parts in succession.

10. In an indicator, the combination with a series of indicating parts each having a driving ratchet, of stepping pawls adapted to advance said ratchets, a pair of magnets arranged to operate the stepping pawls of alternate ratchets, and means controlled by the displacement of the successive indicating parts operated by each magnet for bringing successively into service the stepping pawls of the indicating parts operated by the other magnet.

11. In an indicator, the combination with a series of juxtaposed indicating wheels each having a driving ratchet, of a stepping pawl for each ratchet, and a cam moved by each wheel intermediate in the series adapted in its displacement to prevent the operative engagement of the stepping pawl and ratchet of the preceding wheel of the series.

12. In an indicator, the combination with a series of juxtaposed indicating wheels each having a driving ratchet, of a stepping pawl for each ratchet, and a cam associated with each wheel normally preventing the operative engagement of the stepping pawl and ratchet of the wheel next succeeding in the series and adapted when displaced to permit such engagement.

13. The combination with a series of ratchets, of holding-pawls for each ratchet, means tending to move said holding pawls into operative position, a rock-shaft upon which said holding pawls are independently pivoted, parts fixed to said rock shaft adapted to engage said holding pawls, and an electromagnet arranged to control said rock shaft.

14. In an indicator, the combination with a series of indicating wheels mounted side by side upon a shaft, of a ratchet carried by each wheel, a stepping pawl for each ratchet, said stepping pawls being mounted upon rotatable parts concentric with said shaft, and means for actuating said rotatable parts.

15. In an indicator, the combination with a series of indicating wheels mounted side by side, a ratchet carried by each wheel, a stepping pawl for each ratchet, a holding pawl for each ratchet, a magnet controlling the engagement of all the holding pawls with their ratchets, electromagnetic mechanism for operating said stepping pawls to advance said wheels in sequence, and spring means for returning said wheels to normal position when released.

16. In an indicator, the combination with a series of indicating wheels, each having a ratchet, of a stepping pawl and a holding pawl for each ratchet, a holding magnet controlling the operative relation of all the holding pawls to their ratchets, a pair of stepping magnets arranged to operate the stepping pawls of alternate ratchets respectively, and two cams mounted to rotate with each intermediate wheel of the series controlling the engagement of the stepping pawls of the preceding and succeeding wheels with their respective ratchets; whereby said stepping magnets when operated in alternation act to advance the indicating wheels in succession.

17. In an indicator, the combination with a series of indicating wheels mounted side by side upon a shaft, of a ratchet carried by each wheel, a stepping pawl for each ratchet, said stepping pawls being carried by rotatable parts concentric with the shaft, the alternate pawl-carrying parts being mounted to rock together, two stepping magnets having armatures operatively-connected respectively to the two sets of pawl-carrying parts, a holding-pawl for each ratchet, means tending to move said holding pawls into operative position, an electromagnet controlling said holding pawls, spring means for returning the indicating wheels to normal position when released, and means actuated in the operation of each intermediate wheel of the series for bringing into service the stepping pawl of the succeeding wheel and throwing out of service the stepping pawl of the preceding wheel.

18. In combination, a series of ratchets, a holding-pawl for each ratchet, a rock-shaft upon which said pawls are pivotally supported, means tending to move said pawls into engagement with said ratchets, arms carried by said rock-shaft for holding said pawls out of engagement with said ratchets, and a magnet for controlling the movement of said rock-shaft whereby the pawls are controlled.

In witness whereof, I, hereunto subscribe my name this seventeenth day of September, A. D., 1908.

AMOS F. DIXON.

Witnesses:
   John N. Reynolds,
   Oscar F. Forsberg.